(12) United States Patent
Berger et al.

(10) Patent No.: US 9,536,092 B2
(45) Date of Patent: *Jan. 3, 2017

(54) METHOD, SYSTEM, AND PROGRAM PRODUCT FOR REMOTELY ATTESTING TO A STATE OF A COMPUTER SYSTEM

(71) Applicant: International Business Machines Corporation, Armonk, NY (US)

(72) Inventors: Stefan Berger, Ossining, NY (US); Kenneth Goldman, Norwalk, CT (US); Trent R. Jaeger, Port Matilda, PA (US); Ronald Perez, Piedmont, CA (US); Reiner Sailer, Scarsdale, NY (US); Enriquillo Valdez, Brooklyn, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/044,609

(22) Filed: Feb. 16, 2016

(65) Prior Publication Data

US 2016/0164862 A1    Jun. 9, 2016

Related U.S. Application Data

(63) Continuation of application No. 12/170,504, filed on Jul. 10, 2008, now Pat. No. 9,298,922, which is a
(Continued)

(51) Int. Cl.
*G06F 21/57*     (2013.01)
*H04L 9/32*     (2006.01)
*H04L 29/06*     (2006.01)

(52) U.S. Cl.
CPC ............ *G06F 21/57* (2013.01); *H04L 9/3271* (2013.01); *H04L 63/0428* (2013.01);
(Continued)

(58) Field of Classification Search
CPC ...................................................... G06F 21/57
See application file for complete search history.

(56) References Cited

U.S. PATENT DOCUMENTS 7,058,807 B2    6/2006    Grawrock et al.
7,210,169 B2    4/2007    Smith et al.
(Continued)

OTHER PUBLICATIONS

Reid et al.; Privacy and trusted computing; Published in: Database and Expert Systems Applications, 2003. Proceedings. 14th International Workshop on; Date of Conference: Sep. 1-5, 2003; pp. 383-388; IEEE Xplore.*
Sadeghi et al.; Property-based attestation for computing platforms: caring about properties, not mechanisms; Published in: Proceeding NSPW '04 Proceedings of the 2004 workshop on New security paradigms; 2004; pp. 67-77; ACM Digital Library.*
(Continued)

*Primary Examiner* — Bradley Holder
(74) *Attorney, Agent, or Firm* — Hoffman Warnick LLC; Mercedes Hobson (57) ABSTRACT

A method, system, and program product for remotely attesting to a state of computing system is provided. Specifically, the present invention allows a remote system to establish trust in the properties of the computer system. The properties to be trusted are expanded from the usual system software layers and related configuration files to novel types of data such as static data specific to the computer system, dynamic data determined at system startup, or dynamic data created as the computer system runs applications.

17 Claims, 6 Drawing Sheets

Related U.S. Application Data continuation of application No. 11/463,563, filed on Aug. 9, 2006, now abandoned.

(52) U.S. Cl.
CPC .......... *H04L 63/06* (2013.01); *H04L 63/0823* (2013.01); *H04L 63/1433* (2013.01); *H04L 63/164* (2013.01); *H04L 63/166* (2013.01); *H04L 2209/127* (2013.01)

(56) References Cited

U.S. PATENT DOCUMENTS

| | | | | |
|---|---|---|---|---|
| 7,350,072 | B2* | 3/2008 | Zimmer | G06F 21/57 713/156 |
| 7,412,596 | B2* | 8/2008 | Challener | G06F 21/575 713/2 |
| 7,574,600 | B2 | 8/2009 | Smith | |
| 7,636,442 | B2 | 12/2009 | Scarlata et al. | |
| 7,818,585 | B2* | 10/2010 | Kilian-Kehr | G06F 21/10 705/59 |
| 2003/0196083 | A1 | 10/2003 | Grawrock et al. | |
| 2005/0120219 | A1 | 6/2005 | Munetoh et al. | |
| 2005/0149722 | A1 | 7/2005 | Wiseman et al. | |
| 2005/0149729 | A1 | 7/2005 | Zimmer et al. | |
| 2005/0149730 | A1* | 7/2005 | Aissi | G06F 21/31 713/168 |
| 2005/0223007 | A1* | 10/2005 | Zimmer | G06F 21/57 |
| 2005/0268093 | A1 | 12/2005 | Proudler | |
| 2006/0015732 | A1 | 1/2006 | Liu | |
| 2006/0085630 | A1* | 4/2006 | Challener | G06F 21/575 713/2 |
| 2006/0137022 | A1* | 6/2006 | Kilian-Kehr | G06F 21/10 726/27 |
| 2006/0212939 | A1 | 9/2006 | England et al. | |
| 2007/0030824 | A1 | 2/2007 | Ribaudo et al. | |
| 2007/0226505 | A1 | 9/2007 | Brickell | |
| 2008/0022355 | A1 | 1/2008 | Khosravi et al. | |
| 2008/0163212 | A1 | 7/2008 | Zimmer et al. | |

OTHER PUBLICATIONS

Google Patents (search engine), search term: 'collection of PCR values of credentials for connection', May 23, 2010.
Google Patents (search engine), search term: 'measure dynamic data for platform configuration register and hash'; Nov. 2, 2010.
Google Patents (search engine), search term: 'measuring the integrity of public key and storing the value in pcr'; Jun. 6, 2011.
Google Patents (search engine), search term: 'pcr value on periodically generated data for tpm'; Sep. 28, 2010.
Google Patents (search engine), search term: 'remote attestation of computer system with challenge'; Dec. 11, 2009.
Google Patents (search engine), search term: 'secure channel and platform register and certificate'; May 23, 2010.
Google Patents (search engine), search term: 'pcr value on configuration including hash of a public key'; Nov. 26, 2011.
Google Patents (search engine), search term: 'Storing the pcr measurements of current configuration'; Jan. 27, 2011.
Google Patents (search engine), search term: 'TCG and dynamic ip address'; Dec. 11, 2009.
Reid, Nieto and Dawson; "Privacy and Trusted Computing"; Research paper for IEEE; 2003; Published by the Institute of Information Sciences and Electronics, 2003, 6 pages.
Sadeghi and Stuble; "Porperty-based Attestation for Computing Platforms: Caring about properties, not mechanisms"; Research paper for NSPW, 2004, 11 Pages.
Chen. Office Action Communication for U.S. Appl. No. 11/463,563. Dated Nov. 8, 2010, 30 pages.
Chen. Final Office Action Communication for U.S. Appl. No. 11/463,563. Dated May 27, 2010, 29 pages.
Chen. Office Action Communication for U.S. Appl. No. 12/170,504. Dated Oct. 4, 2010, 42 pages.
Chen. Final Office Action Communication for U.S. Appl. No. 12/170,504. Dated Feb. 3, 2011, 33 pages.
Chen. Office Action Communication for U.S. Appl. No. 12/170,504. Dated Jun. 21, 2011, 37 pages.
Chen. Final Office Action Communication for U.S. Appl. No. 12/170,504. Dated Dec. 8, 2011, 36 Pages.

* cited by examiner

METHOD, SYSTEM, AND PROGRAM PRODUCT FOR REMOTELY ATTESTING TO A STATE OF A COMPUTER SYSTEM

CROSS-REFERENCE TO RELATED APPLICATIONS

This application is a continuation of application Ser. No. 12/170,504, filed on Jul. 10, 2008, that is a continuation of application Ser. No. 11/463,563 filed Aug. 9, 2006.

BACKGROUND OF THE INVENTION

1. Field of the Invention

This invention relates to remotely establishing the specific or dynamic properties of a computer system. More specifically, it relates to remotely establishing trust in properties of a computer system.

2. Related Art

Current Trusted Computing Group (TCG) use cases provide the means for remote parties to attest to the software state of a computer system/platform. The software state includes measurements of the software chain, and might include configuration files used to initialize or customize a software module. The attestation method, as described in TCG documents, begins with a Core Root of Trust for Measurement (CRTM) that measures the software and possibly configuration files of the next layer of software to run. Each layer in turn measures the next layer before calling it. Digests of these measurements are extended through a one-way hash function into Platform Configuration Registers (PCRs) contained in a Trusted Platform Module (TPM). The measurement names and values are also appended to a measurement list.

During the remote attestation process, a set of PCRs is quoted—digested, and digitally signed with a trusted Attestation Identity Key (AIK). The remote party/system validates the AIK certificate issued by a trusted privacy certificate authority, the digital signature of the quote, and the integrity of the measurement list by comparing it to the PCR state included in the quote. Once the measurement list is trusted, the remote system uses it to determine whether the attesting system is running trusted software.

Current uses measure known, expected, constant, system-independent data. A typical measurement is a software stack, from bootstrap loader, through Operating System load, and finally application load. Remote systems doing an attestation are expected to have known good values. Even when other data such as configuration files are measured, the literature envisions a limited number of variations among systems, a relatively homogeneous environment.

By measuring data common to many systems, and by storing only static data, not data generated at run time, the remote system needs to store only a small list of trusted measurements (software modules or configuration files), and can use that list to attest a large number of systems across an enterprise. While this attestation is valuable for trusted computing, it does not address establishing trust in data that may be specific to a system or even data that may be generated or changed as the system runs.

For example, there are currently mechanisms to establish secure communication tunnels, usually based on public key certificates (e.g., SSL, IPSEC, and Web Services Security). There are also techniques to establish properties of remote systems using the TPM or other core root of trust elements. Unfortunately, these two separate mechanisms do not ensure that the system for which properties are established during remote attestation is the same system at which the protected tunnel ends. This is essential for establishing security guarantees in distributed environments. One known solution is to create trusted third parties that "vouch" that certificates used during remote attestation and certificates used to establish secure tunnels belong to the same system. Drawbacks of known solutions include (among others): (1) third parties are difficult to establish; (2) third parties are currently unable to solve key revocation in a scalable and cost-efficient way; and (3) it is extremely difficult to find commonly trusted parties in heterogeneous distributed environments.

In view of the foregoing, there exists a need for a solution that solves at least one of the deficiencies in the related art.

SUMMARY OF THE INVENTION

The present invention expands the current use of PCRs to include not only common, static data measurements, but also computer system-specific, static data measurements and dynamic data. Adding static but system specific measurements allows a remote system to attest to and therefore attach those measurements to measurements of common data such as the software running on the system. Such static data would typically be present at system startup. An example of system specific static data is a network communications channel public key or certificate. Adding these measurements to PCRs allows a remote system to attest to the system properties at the end points of a secure communication channel by anchoring public keys and relevant attributes associated with establishing a secure channel to the system's integrity measurements.

Adding dynamic data calculated as the system runs allows a remote party/system to attest to and therefore attach those measurements to measurements of common data such as the software running on the system. Some dynamic data is typically generated once. An example of dynamic data typically assigned at boot time is a dynamically assigned IP address. Other dynamic data is continuously generated. An example of dynamic data determined as the system runs applications is a log of activity such as logins or system hardware or software errors. Adding these measurements to PCRs allows the remote system to attest that the activity, system, event, or error log was generated by a trusted system and not altered.

A first aspect of the present invention provides a method of remotely attesting to a state of a computer system, comprising: storing data specific TO the computer system in a set of Platform Configuration Registers (PCRs); receiving an attestation challenge from a remote computer system; and responding to the attestation challenge using the data specific to the computer system.

A second aspect of the present invention provides a method of a remote system establishing a secure connection to a local system comprising: receiving a list of names of measured items specific to the local system, values of the measured items, and signed states of current Platform Configuration Register (PCR) values on the remote system from the local system; requesting a secure connection to the local system and receiving an authentication credential of the local system; verifying that the authentication credential is contained in the received list of names; and determining whether to continue establishing the secure connection based on the verifying.

A third aspect of the present invention provides a system for remotely attesting to a state of a computer system, comprising: a measurement system for measuring data specific to the computer system; a PCR system for storing the data in a set of Platform Configuration Registers (PCRs); a challenge reception system for receiving an attestation challenge from a remote computer system; and a quotation system for responding to the attestation challenge using the data stored in the set of PCRs.

A fourth aspect of the present invention provides a program product stored on a computer readable medium for remotely attesting to a state of a computer system, the computer readable medium comprising program code for causing a computer system to perform the following steps: measuring data specific to the computer system; storing the data in a set of Platform Configuration Registers (PCRs); receiving an attestation challenge from a remote computer system; and responding to the attestation challenge using the data stored in the set of PCRs.

A fifth aspect of the present invention provides a method for deploying an application for remotely attesting to a state of a computer system, comprising: providing a computer infrastructure being operable to: measure data specific the computer system; store the data in a set of Platform Configuration Registers (PCRs); receive an attestation challenge from a remote computer system; and respond to the attestation challenge using the data stored in the set of PCRs.

A sixth aspect of the present invention provides computer software embodied in a propagated signal for remotely attesting to a state of a computer system, the computer software comprising instructions for causing a computer system to perform the following steps: measuring data specific the computer system; storing the data in a set of Platform Configuration Registers (PCRs); receiving an attestation challenge from a remote computer system; and responding to the attestation challenge using the data stored in the set of PCRs.

Therefore, the present invention provides a method, system, and program product for remotely attesting to a state of a computer system, as well as for a remote system to establish a secure connection to a local system.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention expands the current use of PCRs to include not only common, static data measurements, but also computer system-specific static data measurements and dynamic data. Adding static but system specific measurements allows a remote system to attest to and therefore attach those measurements to measurements of common data such as the software running on the system. Such static data would typically be present at system startup. An example of system specific static data is a network communications channel public key or certificate. Adding these measurements to PCRs allows a remote system to attest to the system properties at the end points of a secure communication channel by anchoring public keys and relevant attributes associated with establishing a secure channel to the system's integrity measurements.

Adding dynamic data calculated as the system runs allows a remote party/system to attest to and therefore attach those measurements to measurements of common data such as the software running on the system. Some dynamic data is typically generated once. An example of dynamic data typically assigned at boot time is a dynamically assigned IP address. Other dynamic data is continuously generated. An example of dynamic data determined as the system runs applications is a log of activity such as logins or system hardware or software errors. Adding these measurements to PCRs allows the remote system to attest that the activity, system, event, or error log was generated by a trusted system and not altered.

Figure 1:
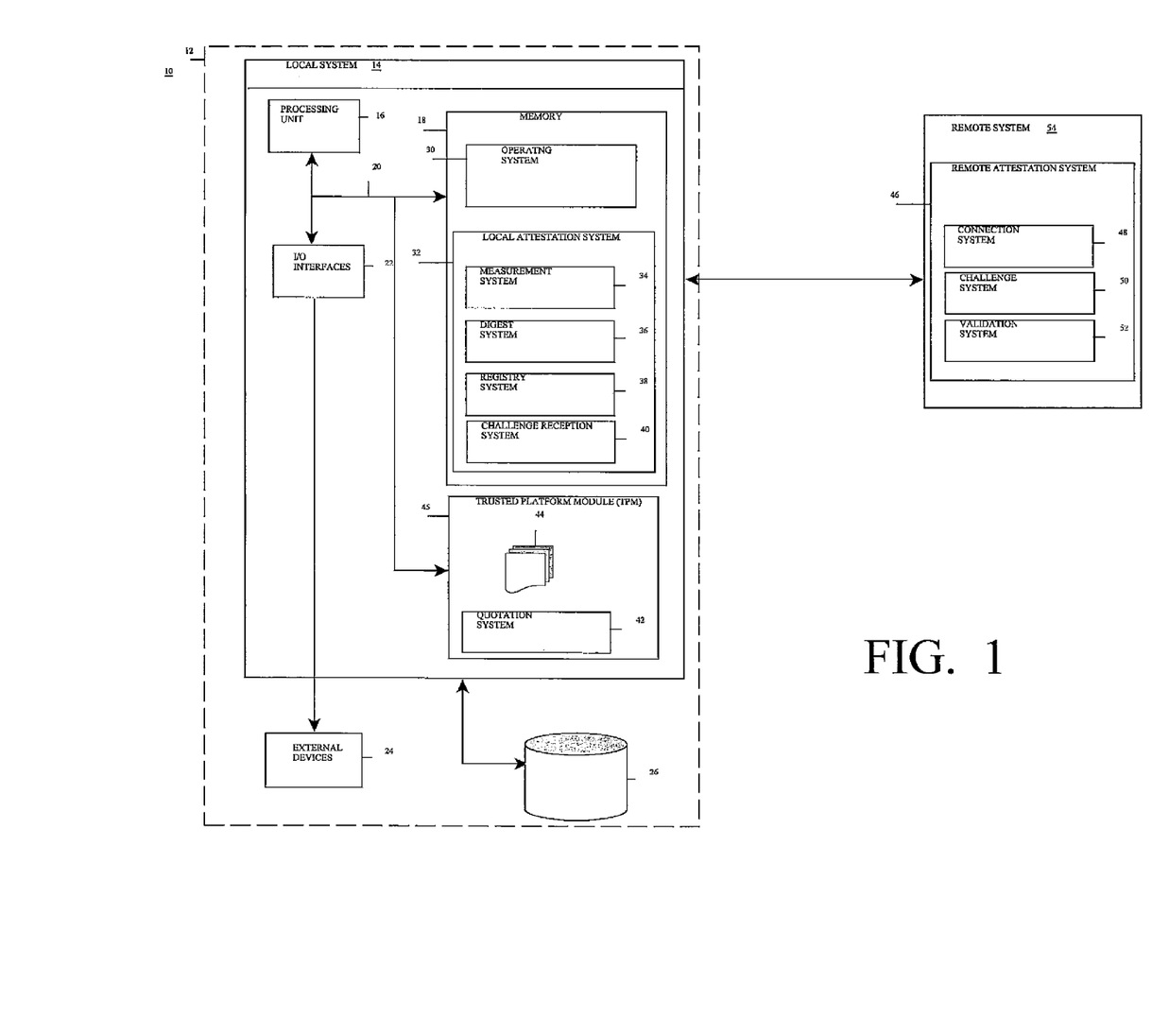
FIG. 1 depicts a system for remotely attesting to the state of a computer system according to the present invention.

Referring now to FIG. 1, a system 10 for remotely attesting to a state of a computer system according to the present invention is shown. As depicted, system 10 includes a local (computer) system 14 deployed within a computer infrastructure/environment 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to remotely attest to a state of a computer system according to the present invention.

As shown, local system 14 includes a processing unit 16, a memory 18, a bus 20, and input/output (I/O) interfaces 22. Further, local system 14 is shown in communication with external I/O devices/resources 24 and storage system 26. In general, processing unit 16 executes computer program code, such as operating system 30, which is stored in memory 18 and/or storage system 26. While executing computer program code, processing unit 16 can read and/or write data to/from memory 18, storage system 26, and/or I/O interfaces 22. Bus 20 provides a communication link between each of the components in local system 14. External interfaces 24 can comprise any devices (e.g., keyboard, pointing device, display, etc.) that enable a user to interact with local system 14 and/or any devices (e.g., network card, modem, etc.) that enable local system 14 to communicate with one or more other devices.

Computerized infrastructure 12 is only illustrative of various types of computer infrastructures for implementing the invention. For example, in one embodiment, computerized infrastructure 12 comprises two or more devices (e.g., a server cluster) that communicate over a network to perform the various process steps of the invention. Moreover, local system 14 is only representative of various possible computer systems that can include numerous combinations of hardware. To this extent, in other embodiments, local system 14 can comprise any specific purpose article of manufacture comprising hardware and/or computer program code for performing specific functions, any article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or storage system 26 can comprise any combination of various types of data storage and/or transmission media that reside at one or more physical locations. Further, I/O interfaces 22 can comprise any system for exchanging information with one or more external interfaces 24. Still further, it is understood that one or more additional components (e.g., system software, math co-processing unit, etc.) not shown in FIG. 1 can be included in local system 14. However, if local system 14 comprises a handheld device or the like, it is understood that one or more external interfaces 24 (e.g., a display) and/or storage system 26 could be contained within local system 14, not externally as shown.

Storage system 26 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). It should be understood that although not shown, remote (computer) system 54 includes computerized components similar to local system 14. In addition, although not shown, additional components, such as cache memory, communication systems, system software layers (e.g., BIOS, Boot, etc.) may be incorporated into local system 14 and/or remote system 54.

Shown in memory 18 of local system 14 is operating system 30 and local attestation system 32. Local attestation system 32 includes measurement system 34, digest system 36, registry system 38, and challenge reception system 40. Also provided on local system 14 (as a chip outside of memory 18) is trusted platform module 45 that contains a set of PCRs 44 and a quotation system 42. Shown loaded (e.g., in memory) of remote system 54 is remote attestation system 46, which includes connection system 48, challenge system 50, and validation system 52. It should be appreciated that the same functionality could be implemented with a different configuration of systems and/or sub-systems than is shown in FIG. 1. This depiction is intended to be illustrative only.

As indicated above, the present invention allows a secure connection to be established between local system 14 and remote system 54. Specifically, the state of local system 14 will be attested to by remote system 54 using data not previously utilized for such attestation. To this extent, assume that connection system 48 attempts to establish a secure connection (e.g., such as an SSL or IPSec connection) with local system 14. Measurement system 34 will initially make initial data measurements. In a typical embodiment, data measured includes (among other things) data specific to local system 14. Measurement system 34 will also compile a list of names of measured items and their measured values.

Under the present invention, the data measured can include static data and/or dynamic data associated with local system 14. One example of static data is a public key used for establishing a communications channel. The dynamic data can be data generated as local system 14 is running. Along these lines, the dynamic data can be generated once and assigned to local system 14, or periodically as local system 14 runs. Examples of dynamic data include a network dynamic IP address assigned to local system 14, a notification that a user has logged into local system 14, information related to the execution or termination of a program running on local system 14, an event such as an error condition occurring on local system 14, or the like.

Regardless, digest system 36 will compute a digest that contains the information measured by measurement system 34, and registry system 38 will store the digest in a set (e.g., one or more) of PCRs 44. In attempting to establish and/or maintain the connection to local system 14, challenge system 50 will issue an attestation challenge that is received by challenge reception system 40. In response, quotation system 42 will generate a quotation/response to the attestation challenge. Specifically, quotation system 42 will incorporate the challenge into a TPM quote, along with a digest of the selected PCRs. The quote is signed with an AIK. The signature, list compiled by measurement system 34, the AIK, and AIK certificate (e.g., an authentication credential such as an X.509 certificate) are returned to the remote system 54.

Upon receipt, validation system 52 will validate the AIK certificate. Validation may include validating the digest, validating the signature against a privacy certificate authority public key, validating the expiration data, etc. This establishes trust in the AIK public key using the privacy certificate authority as the root of trust. The validation system will also validate the quote signature using the AIK public key. This establishes trust in the quote contents. Further, validation system 52 will validate the measurements. Expected PCR values are reconstructed using the digests included in the measurement list. The expected values are digested and validated against the digest returned in the quote. This establishes trust in the measurement list contents. In addition, validation system 52 will verify that the authentication credential was contained in the received list. Specifically, validation system 52 will verify that a hash of the authentication credential was contained in the received list. Based on the validation performed by validation system 52, connection system 48 will determine whether to continue establishing the secure connection with local system 14.

Figure 2:
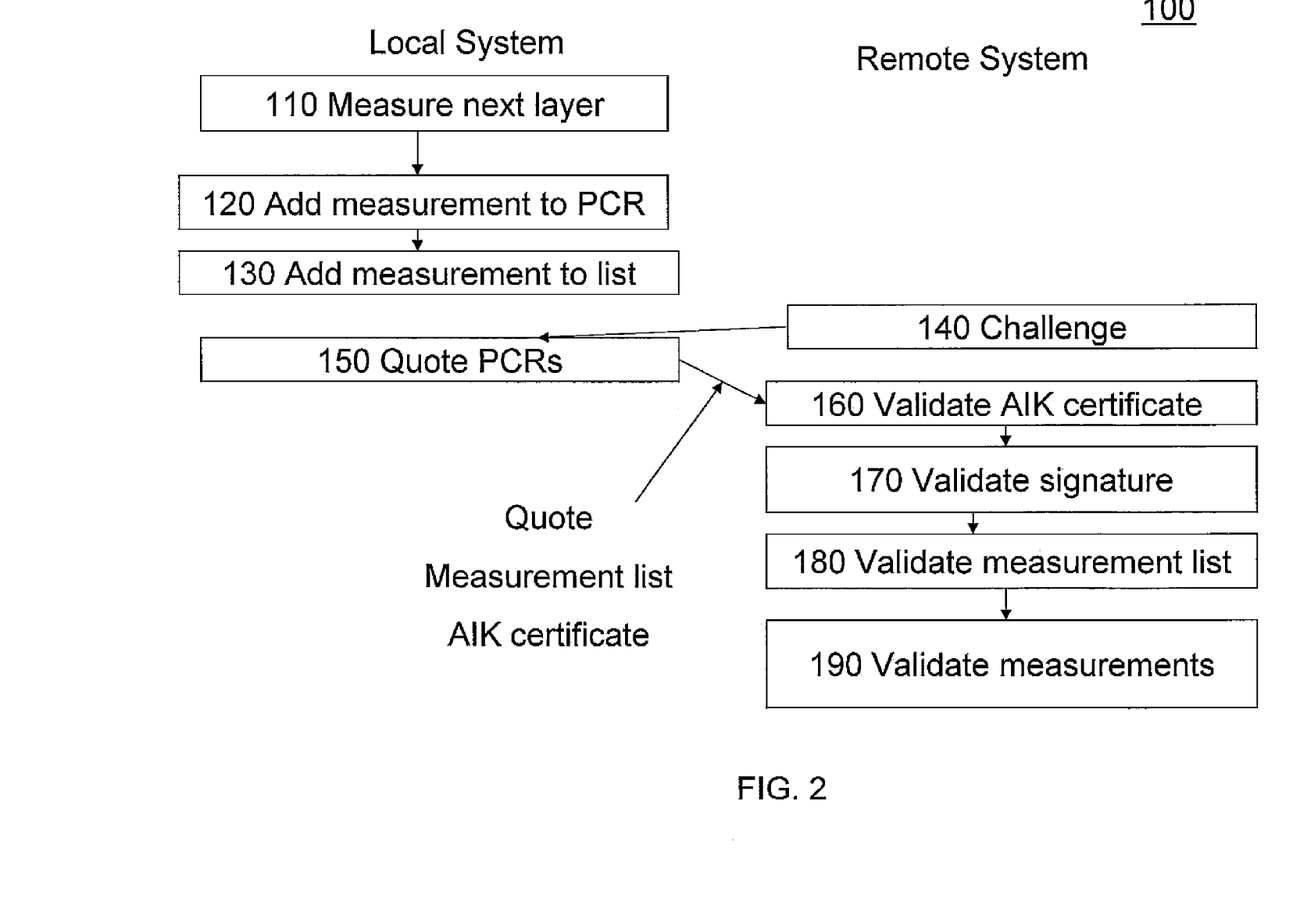
FIG. 2 depicts a flow chart of a remote attestation process according to the present invention.

These operations will be now be described in conjunction with the flow diagrams of FIGS. 2-6. FIG. 2 shows a flow chart 100 of the attestation process of the present invention. In step 110, a measuring software layer measures the next measured software layer to be called. In step 120, the measuring software layer calculates a digest of the measured layer and extends the digest into a TPM PCR. In step 130, the measuring software layer adds information about the measured software layer to a measurement list.

It should be understood that the order of steps 120 and 130 can be interchangeable. Steps 110, 120, 130 are repeated multiple times as each measured software layer becomes the measuring software layer for the next pass through the loop. During some passes through the loop, other static data such as a software configuration file may be measured.

In step 140, the software waits for an attestation challenge from a remote system/party. In step 150, the software incorporates the challenge into a TPM quote, along with a digest of the selected PCRs. The quote is signed with an AIK. The signature, the list, the AIK, and AIK certificate are returned to the remote system/party. In step 160, the remote system validates the AIK certificate. Validation may include validating the digest, validating the signature against a privacy certificate authority public key, validating the expiration date, etc. This establishes trust in the AIK public key using the privacy certificate authority as the root of trust. In step 170, the remote system validates the quote signature using the AIK public key. This establishes trust in the quote contents. In step 180, the measurement list is validated. Expected PCR values are reconstructed using the digests included in the measurement list. The expected values are digested and validated against the digest returned in the quote. This establishes trust in the measurement list contents. In step 190, the measurement list entries are compared to trusted values for the software or configuration files. It should also be understood that the order of steps 160, 170, 180, and 190 are interchangeable. If all validation steps 160, 170, 180, and 190 succeed, the remote system determines that local system can be trusted.

Figure 3:
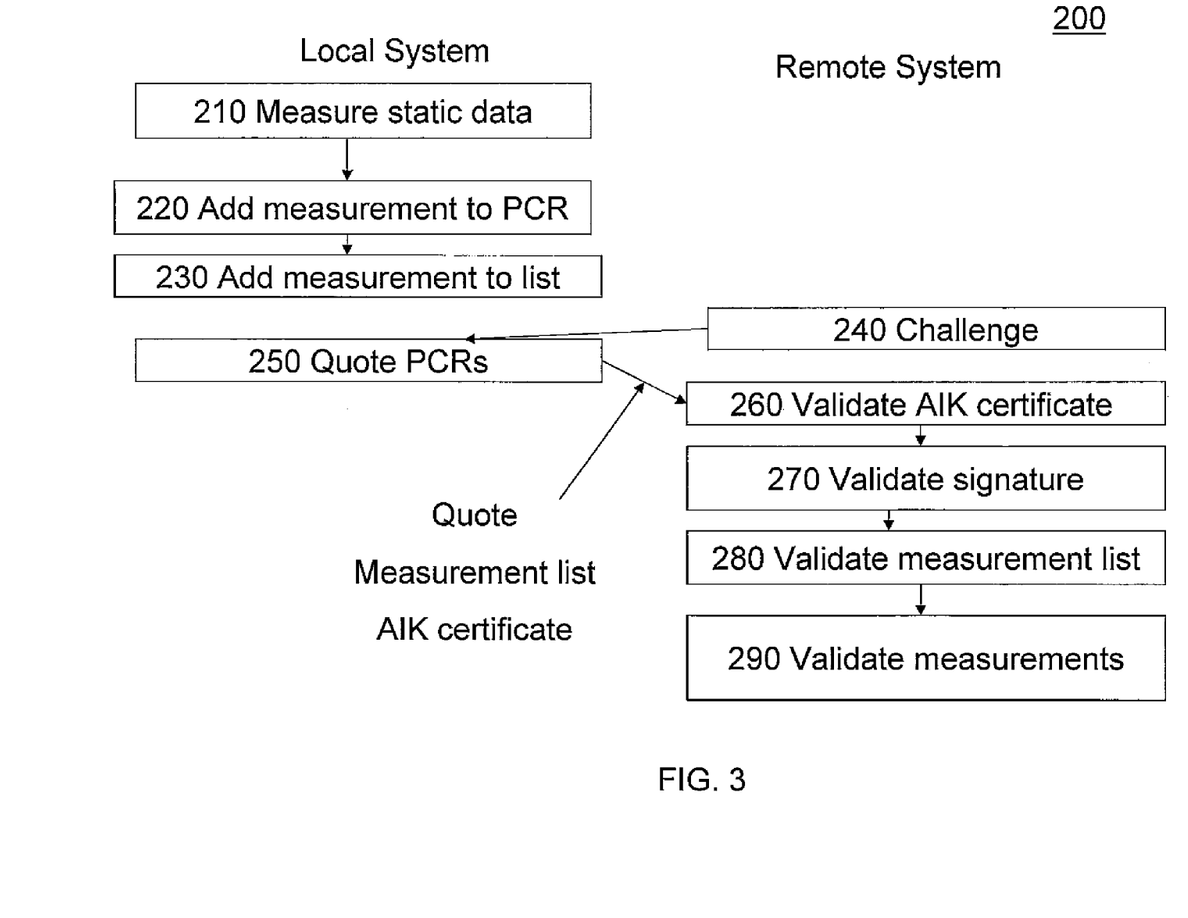
FIG. 3 depicts a flow chart showing the addition of a computer system-specific static measurement according to the present invention.

FIG. 3 depicts a flow chart 200 showing the addition of a system specific static measurement. In general, the steps are substantially similar to those described in FIG. 2 and will not be repeated for clarity. However, in step 210 a measurement is made of data specific to the local system. Examples of such data are networking public keys, certificates, etc. In step 290, measurement list entries are now expanded to include this system specific data. In this way, the remote system atomically links the common software measurements to system specific data. This atomicity assures the remote system that the system specific data did indeed come from the local system running the trusted software.

Figure 4:
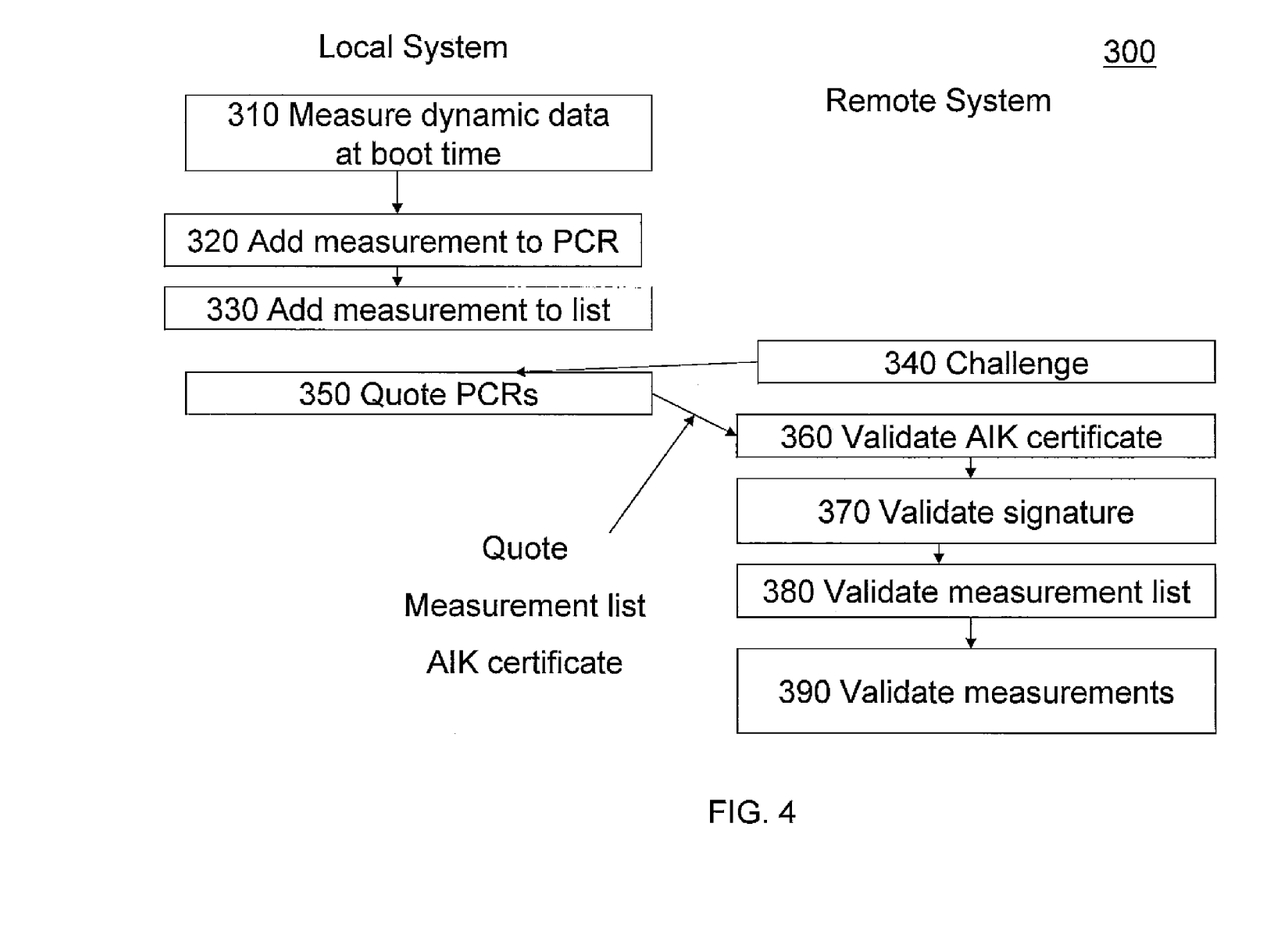
FIG. 4 depicts a flow chart showing the addition of a dynamic measurement at boot time according to the present invention.

FIG. 4 depicts a flow chart 300 showing the addition of a dynamic measurement at boot time. Similar to FIG. 3, the steps are substantially similar to those of FIG. 2 and will not be repeated for clarity. However, in step 310 a measurement is made of dynamic data determined at boot time. Examples of such data are a dynamically allocated IP address, etc. In step 390, measurement list entries are now expanded to include this dynamic data. In this way, the remote system atomically links the common software measurements to the dynamic data. This atomicity assures the remote system that the dynamic data did indeed come from the local system running the trusted software.

Figure 5:
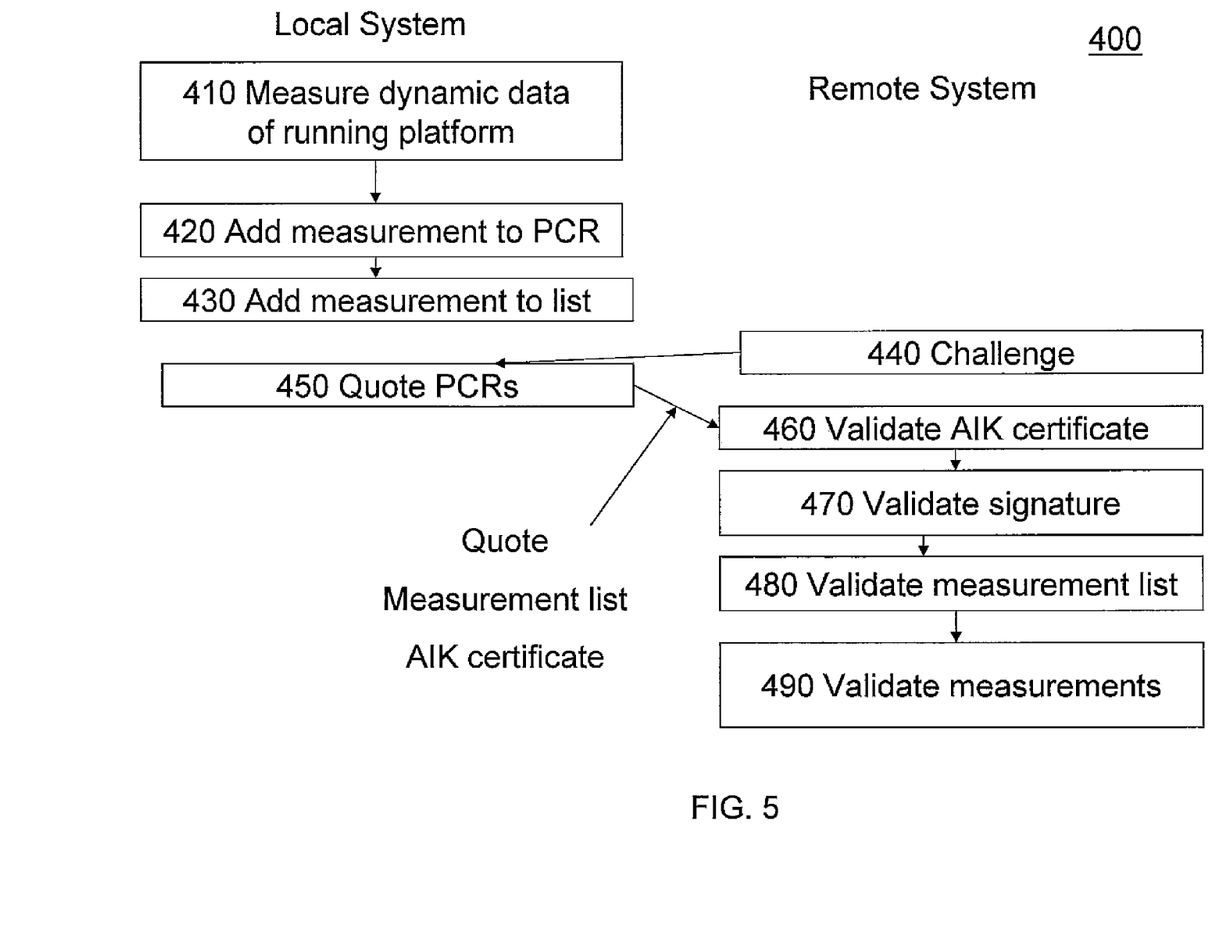
FIG. 5 depicts a flow chart showing the addition of dynamic measurements as the computer system is running according to the present invention.

FIG. 5 depicts a flow chart 400 showing the addition of dynamic measurements as the local system is running. Similar to FIGS. 3 and 4, the steps are substantially similar to those of FIG. 2 and will not be repeated for clarity. However, in step 410 a measurement is made of dynamic data determined as the local system is running. Examples of such data are user login request, software application startup and exit, hardware and software events, etc. Events may be augmented with time stamps, system state, user identifiers, etc. Data could also include a digest of a log file containing such events. In step 490, measurement list entries are now expanded to include this dynamic data determined as the local system is running. For example, the measurement list can now have event or audit logs appended to the previous measurements. In this way, the remote system atomically links the common software measurements to the dynamic data determined as the local system is running. This atomicity assures the remote system that the dynamic data determined as the local system is running did indeed come from the local system running the trusted software. For example, the remote system can now be assured that an event or audit log was generated by trusted software and has not been tampered with by an un-trusted entity.

Figure 6:
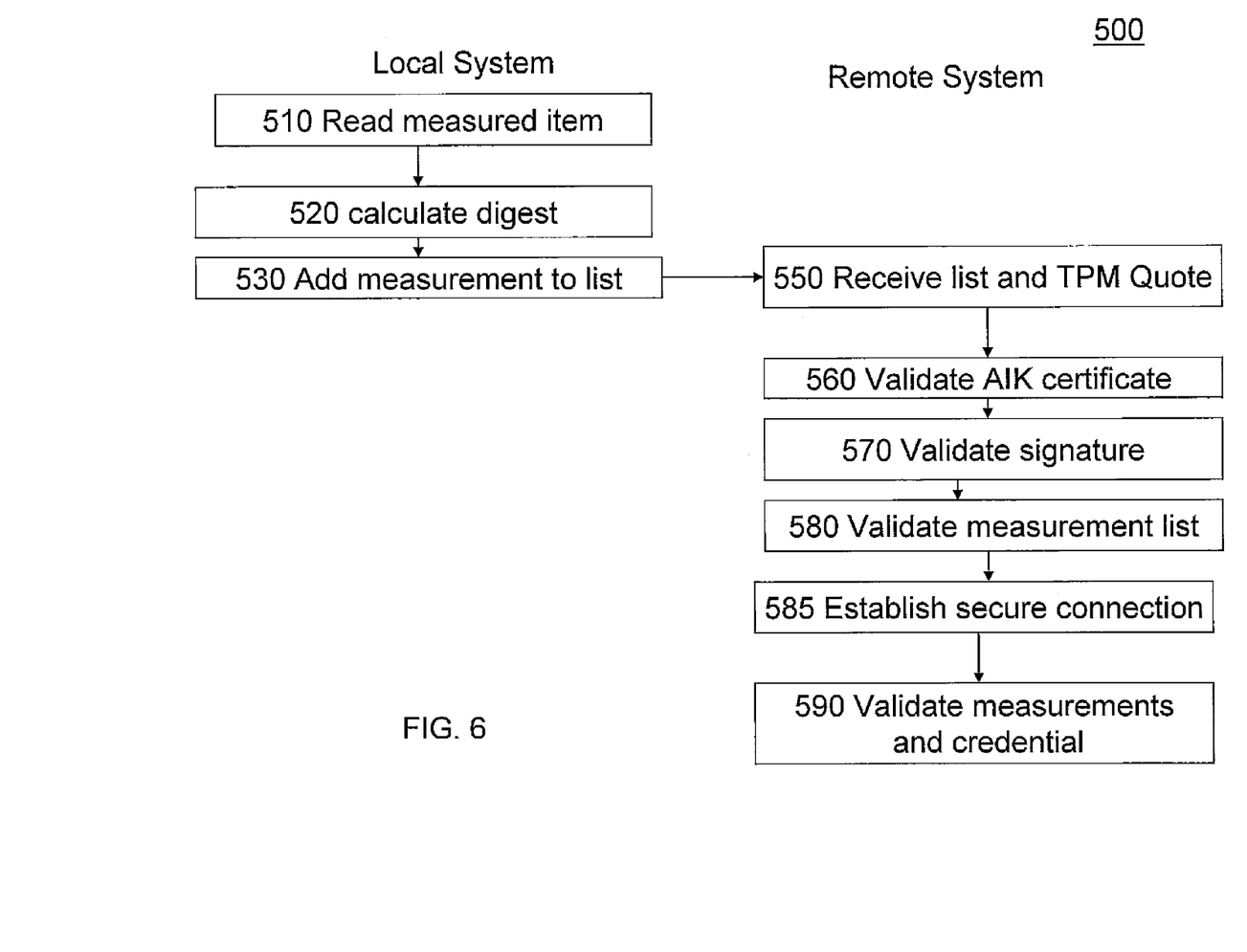
FIG. 6 depicts a flow chart showing the use of attestation in the establishment of a secure communications tunnel according to the present invention.

FIG. 6 depicts a flow chart 500 showing the use of attestation in the establishment of a secure communications tunnel such as an SSL connection, or an IPSec connection. In step 510, a measuring software layer reads a measured item. In step 520, the measuring software layer calculates a digest of the measured item and extends the digest into a TPM PCR. In step 530, the measuring software layer adds the measured item to a list of names of measured items along with the value of the measurement. Steps 510, 520, 530 are repeated for all measured items. Measured items typically include upper software layers to be called by the measuring software layer and may include software configuration files. In this embodiment, an additional measured item is a secure communications authentication credential. The credential can be an X.509 certificate, other forms of public key certificates, or other data formats containing an authentication public key. In step 550, the remote system receives a list containing the names and values of all measured items. It also receives a TPM quote, which is a signed TPM state that includes the current TPM PCR values, and the TPM's AIK certificate. In step 560, the remote system validates the AIK certificate as in step 160 of FIG. 2. In step 570, the remote system validates the quote signature as in step 170 of FIG. 2. In step 580, the remote system verifies the received list of measured items against the reported PCR state from the TPM quote. This step establishes that the measurement list can be trusted. In step 585, the remote system establishes a secure connection to the attesting party. In an alternate implementation, the secure connection can be established before the attestation quote generation and validation. As part of the secure connection protocol, the remote system receives an authentication credential and uses it to establish the connection. This should be the same credential that was measured in steps 510, 520, and 530. In step 590, in addition to the validation functions performed as described for step 190 of FIG. 2, the remote system verifies that the authentication credential received in the measurement list and that received during the secure connection setup are identical.

By executing these validation steps, the remote system is assured that the attesting party is the same party that set up the secure communications channel. Without the trust link established by including the authentication certificate in the TPM quote, it would have been possible that the attestation of correct software state came from one remote system, but that the secure connection came from a different party. For example, a man-in-the-middle could establish the secure connection, but pass the attestation request on to the attestation party and return its response. Including the system specific authentication certificate in the TPM quote eliminates the possibility of this attack.

This embodiment is described in terms of one attesting/local system and one remote system. It is understood that, for certain applications the roles may be reversed during the protocol, so that each system can establish trust in the other.

That is, during certain protocols, both parties can be both the attesting system and the remote system attempting to establish trust.

While shown and described herein as a method and system for remotely attesting to a state of a computer system, it is understood that the invention further provides various alternative embodiments. For example, in one embodiment, the invention provides a computer-readable/useable medium that includes computer program code to enable a computer infrastructure to remotely attest to a state of a computer system. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a providing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to remotely attest to a state of a computer system. In this case, the service provider can create, maintain, support, etc., a computer infrastructure, such as computerized infrastructure 12 (FIG. 1) that performs the process steps of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for remotely attesting to a state of a computer system. In this case, a computerized infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a providing device, such as local system 14 (FIG. 1), from a computer-readable medium; (2) adding one or more providing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a providing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of remotely attesting to a state of a computer system, comprising:
    with the computer system:
    measuring data specific to the computer system;
    storing the data specific to the computer system in a set of Platform Configuration Registers (PCRs), wherein the data specific to the computer system comprises static data associated with the computer system and dynamic data associated with the computer system that is generated as the computer system is running, wherein the static data comprises public key data used for establishing a communications channel, wherein the dynamic data comprises an event occurring on the computer system;
    receiving an attestation challenge from a remote computer system; and
    responding to the attestation challenge using the data specific to the computer system stored in the set of PCRs.

2. The method of claim 1, wherein the dynamic data is generated once and assigned to the computer system.

3. The method of claim 1, wherein the dynamic data comprises a network dynamic IP address assigned to the computer system.

4. The method of claim 1, wherein the dynamic data is generated periodically as the computer system runs.

5. The method of claim 4, wherein the dynamic data comprises a notification that a user has logged into the computer system.

6. The method of claim 4, wherein the dynamic data relates to at least one of: an execution or a termination of a program running on the computer system.

7. The method of claim 1, wherein the event comprises an error condition detected by the computer system.

8. A system for remotely attesting to a state of a computer system, comprising:
    a measurement engine for measuring data specific to the computer system;
    a Platform Configuration Register (PCR) circuitry for storing the data specific to the computer system in a set of Platform Configuration Registers (PCRs), wherein the data specific to the computer system comprises static data associated with the computer system and dynamic data associated with the computer system that is generated as the computer system is running, wherein the static data comprises public key data used for establishing a communications channel, wherein the dynamic data comprises an event occurring on the computer system;
    a challenge reception engine for receiving an attestation challenge from a remote computer system; and
    a quotation engine for responding to the attestation challenge using the data specific to the computer system stored in the set of PCRs.

9. The system of claim 8, wherein the dynamic data is generated once and assigned to the computer system.

10. The system of claim 8, wherein the dynamic data comprises a network dynamic IP address assigned to the computer system.

11. The system of claim 8, wherein the dynamic data is generated periodically as the computer system runs.

12. The system of claim 11, wherein the dynamic data comprises a notification that a user has logged into the computer system.

13. The system of claim 11, wherein the dynamic data relates to at least one of: an execution or a termination of a program running on the computer system.

14. The system of claim 8, wherein the event comprises an error condition detected by the computer system.

15. The system of claim 8, further comprising a digest system for computing a digest that contains the data specific to the computer system, wherein the PCR system stores the digest in the set of PCRs.

16. A program product stored on a non-transitory computer readable medium for remotely attesting to a state of a computer system, the non-transitory computer readable medium comprising program code, that when executed by a processing unit, causes a computer system to perform the following steps:
measuring data specific to the computer system;
storing the data specific to the computer system in a set of Platform Configuration Registers (PCRs), wherein the data specific to the computer system comprises static data associated with the computer system and dynamic data associated with the computer system that is generated as the computer system is running, wherein the static data comprises public key data used for establishing a communications channel, wherein the dynamic data comprises an event occurring on the computer system;
receiving an attestation challenge from a remote computer system; and
responding to the attestation challenge using the data specific to the computer system stored in the set of PCRs.

17. A method for deploying an application for remotely attesting to a state of a computer system, comprising:
providing a computerized infrastructure configured to:
measure data specific to the computer system;
store the data specific to the computer system in a set of Platform Configuration Registers (PCRs) wherein the data specific to the computer system comprises static data associated with the computer system and dynamic data associated with the computer system that is generated as the computer system is running, wherein the static data comprises public key data used for establishing a communications channel, wherein the dynamic data comprises an event occurring on the computer system;
receive an attestation challenge from a remote computer system; and
respond to the attestation challenge using the data specific to the computer system stored in the set of PCRs.

* * * * *